(12) United States Patent
Wolf et al.

(10) Patent No.: US 12,542,452 B2
(45) Date of Patent: Feb. 3, 2026

(54) ENERGY MANAGEMENT SYSTEM

(71) Applicant: Fronius International GmbH, Pettenbach (AT)

(72) Inventors: Martin Wolf, Pettenbach (AT); Christian Angerer, Pettenbach (AT); Thomas Hüttner, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 18/860,718

(22) PCT Filed: Apr. 25, 2023

(86) PCT No.: PCT/EP2023/060834
§ 371 (c)(1),
(2) Date: Oct. 28, 2024

(87) PCT Pub. No.: WO2023/208947
PCT Pub. Date: Nov. 2, 2023

(65) Prior Publication Data
US 2025/0337272 A1    Oct. 30, 2025

(30) Foreign Application Priority Data

Apr. 29, 2022 (EP) .................... 22171024

(51) Int. Cl.
*H02J 13/00* (2006.01)
(52) U.S. Cl.
CPC ............. *H02J 13/00028* (2020.01)

(58) Field of Classification Search
CPC ................................. H02J 13/00028
See application file for complete search history.

(56) References Cited

U.S. PATENT DOCUMENTS

| 2012/0089260 | A1 | 4/2012 | Krohne et al. | |
| 2018/0342894 | A1* | 11/2018 | Kuo | H04W 24/00 |
| 2018/0351401 | A1* | 12/2018 | Binder | H02J 13/00017 |
| 2021/0066919 | A1 | 3/2021 | Lee | |

OTHER PUBLICATIONS

International Search Report and the Written Opinion Dated Aug. 11, 2023 From the International Searching Authority Re. Application No. PCT/EP2023/060834. (9 Pages).

* cited by examiner

*Primary Examiner* — Jeffrey M Shin

(57) ABSTRACT

An energy management system comprising a photovoltaic system (1) having at least one photovoltaic array (2) adapted to generate electrical DC power converted by an inverter (4) of said photovoltaic system (1) into AC power,
Wherein in a normal operation mode of the photovoltaic system (1) an energy flow within said photovoltaic system (1) is controlled according to control values received as setpoints via an Internet connection (15) from a remote energy management scheme run by a remote server (14),
Wherein if a communication failure with the remote server (14) is detected a fallback operation mode of the photovoltaic system (1) is initiated where the energy flow within said photovoltaic system (1) is controlled according to local control values provided as setpoints by a local energy management scheme.

14 Claims, 5 Drawing Sheets

ENERGY MANAGEMENT SYSTEM

RELATED APPLICATIONS

This application is a National Phase of PCT Patent Application No. PCT/EP2023/060834 having International filing date of Apr. 25, 2023, which claims the benefit of priority of Austria Patent Application No. 22171024.7 filed on Apr. 29, 2022. The contents of the above applications are all incorporated by reference as if fully set forth herein in their entirety.

FIELD AND BACKGROUND OF THE INVENTION

The invention relates to an energy management system adapted to manage and control energy flows between entities of a photovoltaic system, in particular in case of a communication failure of a communication connection between the photovoltaic system and a remote server.

Photovoltaic system comprises an inverter which is provided to convert a direct current (DC) power generated by photovoltaic modules of a photovoltaic array into alternating current (AC) power. The generated AC power can be supplied in a normal operation mode of the photovoltaic system to a power supply grid. A local load network can also be powered by the AC power generated by the inverter of the photovoltaic system. This load network can comprise a wide variety of consumer appliances consuming AC power generated by the inverter. Further, the inverter can also be connected to a local storage unit to store energy locally. Accordingly, there are different energy flows between the inverter and other entities. When the photovoltaic array receives solar irradiation, it generates a DC current and energy flows from the photovoltaic array to the inverter. Devices of the load network receive energy from the AC side of the inverter. Further, energy can also be stored by the inverter in the local storage unit.

US 2018/0351401 A1 describes an apparatus for a system power device utilized in an interconnected power system. The interconnected power system includes multiple system power. The apparatus includes a processor and a communication interface. The communication interface connects a mobile computing system of a user in close proximity to the system power devices.

A graphical user interface of the mobile computing system allows operational and re-configuration options for the power system including installation, maintenance and monitoring schedules in the power system when the user is in close proximity to the system power devices.

EP 2 941 809 B1 describes an energy control system configured to control the transmission of energy to an electrical load. The energy control system comprises a renewable energy resource: a stored energy resource, a memory configured to store program instructions and an energy system controller. The energy controller of the energy control system has a predictor module, a dispatch planner module and a dispatch module which controls the transmission of energy between the stored energy resource to the electrical load and to the storage device.

During a normal operation of the photovoltaic system, the system is connected to the power supply grid or power supply network. There can be an energy flow from the photovoltaic system to the power supply grid or vice versa. However, in an emergency situation, the photovoltaic system is disconnected from the power supply grid. This situation requires an efficient energy management.

In many use cases, the setpoints for the energy management of the energy flows within the photovoltaic system are provided by a remote server of a cloud. The setpoints are calculated according to a remote energy management scheme by a controller of a server within the cloud. The reason for providing remote setpoints is that the calculation capabilities of controllers within the photovoltaic system are in many use cases more limited than the calculation capabilities of a controller of a server within the cloud. Further, a remote energy management scheme allows for a central adaption and maintenance of the involved calculation algorithms. However, the provision of remote setpoints relies on the data communication between the server of the cloud and the controller of the inverter within the photovoltaic system or a controller performing a local energy management system at the site of the photovoltaic system. Consequently, the energy management system of a photovoltaic system operating according to remote set points is neither robust nor resilient against interruptions or communication problems of the Internet connection between the photovoltaic system and the remote server. The conventional energy management system of a photovoltaic system operating according to remote set points is also neither robust nor resilient against an unavailability of the remote server, in particular during maintenance of the remote server.

SUMMARY OF THE INVENTION

Accordingly, it is an object of the present invention to provide an energy management system which is robust against communication deficiencies of a communication connection between a controller of the photovoltaic system and a remote server.

This object is achieved a by an energy management system and a corresponding method with the features of the independent claims. Further advantageous embodiments are subject-matter of the dependent claims.

The invention provides according to the first aspect an energy management system for a photovoltaic system having at least one photovoltaic array adapted to generate electrical DC power converted by an inverter of said photovoltaic system into AC power, wherein in a normal operation mode of the photovoltaic system an energy flow within said photovoltaic system is controlled according to control values received as set points via an Internet connection from a remote energy management scheme run by a remote server, wherein set points are transmitted by the remote energy management scheme run by the remote server during the normal operation mode periodically or continuously via the Internet connection, and wherein a communication failure with the remote server a fallback operation mode of the photovoltaic system is initiated where the energy flow within said photovoltaic system is controlled according to local control values provided as set points by a local energy management scheme.

In a possible embodiment of the energy management system according the first aspect of the present invention after occurrence of the communication failure with the remote server has been detected at a time point, A, the energy management system is adapted to use after a time period, t1, at a time point, B, the local control values provided by the local energy management scheme in the fallback operation mode.

In a possible embodiment of the energy management system according an aspect of the present invention a transition from the remote control values to the local control values is started after the time period, t1, and during a time period, t2, the local control values are reached smoothly and used as set points to control the energy flow within said photovoltaic system.

In a possible embodiment of the energy management system according to the present invention, the local energy management scheme is performed in the fallback operation mode to optimize a self-consumption of electrical power generated by the photovoltaic arrays of the photovoltaic system and consumed by power-consuming devices of a local load network of said photovoltaic system.

The local energy management scheme can be performed in the fallback operation mode of the photovoltaic system by a controller of the inverter of the photovoltaic system or by a controller of an energy management unit of the energy management system of the photovoltaic system.

In a possible embodiment of the energy management system according to the present invention, the photovoltaic system comprises an inverter adapted to convert a DC power generated by photovoltaic modules of a photovoltaic array into AC power supplied in a normal operation mode of the photovoltaic system via a measurement device into a power supply grid.

In a further possible embodiment of the energy management system according to the present invention, the inverter is connected to at least one storage unit of the photovoltaic system used to store electrical power.

In a further possible embodiment of the energy management system according to the present invention, an energy flow manager is adapted to monitor and control the energy flows between the inverter and other entities of the photovoltaic system connected to the inverter, in particular power-consuming devices of the load network of the photovoltaic system, including the energy flow from the photovoltaic array to a DC
side of the inverter and the energy flow from the inverter to the at least one storage unit of the photovoltaic system and the energy flow between the photovoltaic system and the power supply grid.

In a further possible embodiment of the energy management system according to the present invention, the energy flow manager is executed on a processor of a controller adapted to calculate momentary energy flows, in particular momentary power flows, depending on data provided by different entities of the photovoltaic system including the measurement device and/or the power-consuming loads of the load network.

The controller can be a controller of the inverter of the photovoltaic system or a controller of a dedicated energy management unit of the energy management system used to control energy flows of the photovoltaic system.

In a further possible embodiment of the energy management system according to the present invention, if a power supply grid failure has been detected on the basis of data provided by the measurement device, then an emergency switch of the photovoltaic system is automatically opened by a controller of the inverter or by the by a controller of the energy management unit to disconnect the power supply grid automatically from the photovoltaic system causing the interruption of the energy flow between the inverter and the power supply grid as long as the photovoltaic system does operate in the emergency operation mode.

In a further possible embodiment of the energy management system according to the present invention, if an interruption of the Internet connection caused by the power supply grid is detected, the energy management system is adapted to notify the user by means of the user interface about the emergency operation mode of the photovoltaic system triggered by the power supply grid failure and/or about the interruption of the Internet connection caused by the power supply grid failure and is adapted to trigger the fallback operation mode.

In a further possible embodiment of the energy management system according to the present invention, the user interface is integrated in a user equipment communicating with the energy management system.

In a further possible embodiment of the energy management system according to the present invention, the user interface is integrated in the energy management system of the photovoltaic system.

In a further possible embodiment of the energy management system according to the present invention, the user equipment is integrated into a visual display unit, in particular a LED display board.

In a further possible embodiment of the energy management system according to the present invention, the predictions and recommendations are calculated for the emergency operation mode of the photovoltaic system on the basis of collected data provided by the entities of the photovoltaic system during the emergency operation mode and on the basis of the data calculated during the normal operation mode of the photovoltaic system before the power supply grid failure has been detected and the emergency switch has been opened by the controller of the inverter or by controller of the energy management unit of the energy management system to interrupt the energy flow between the photovoltaic system and the power supply grid.

In a possible embodiment, the collected data is stored in a local data memory of the energy management system.

In a possible embodiment of the energy management system according to the present invention, the collected data comprises solar generation capacity data, solar irradiation data, solar generation capacity forecast data, load usage and power consumption data, load usage and power consumption forecast data, load priority data, initial user input data, storage unit energy level data, user input data, in particular responses to predictions and recommendations, and measurement device data generated by the measurement device.

In a further possible embodiment of the energy management system according to the present invention, the user equipment communicating with the energy management system comprises a mobile user equipment such as a smartphone connected via a wireless link with the energy management system of the photovoltaic system.

The invention provides according to a further aspect a method for performing an energy management of a photovoltaic system having at least one photovoltaic array adapted to generate electrical DC power converted by an inverter of said photovoltaic system into AC power, wherein the method comprises the steps of:
  performing in a normal operation mode of the photovoltaic system a control of energy flows within the photovoltaic system according to control values received as set points via an Internet connection and calculated according to a remote energy management scheme run by a remote server,
  wherein the setpoints are transmitted by the remote energy management scheme run by the remote server during the normal operation mode periodically or continuously via the Internet connection;
  initiating a fallback operation mode of the photovoltaic system if a communication failure with the remote server is detected, wherein in the fallback operation mode of the photovoltaic system the energy flows within the photovoltaic system are controlled according to local control values provided as set points by a local energy management scheme.

BRIEF DESCRIPTION OF THE SEVERAL VIEWS OF THE DRAWING(S)

In the following, possible embodiments of the different aspects of the present invention are described in more detail with reference to the enclosed figures.

DESCRIPTION OF SPECIFIC EMBODIMENTS OF THE INVENTION

Figure 1:
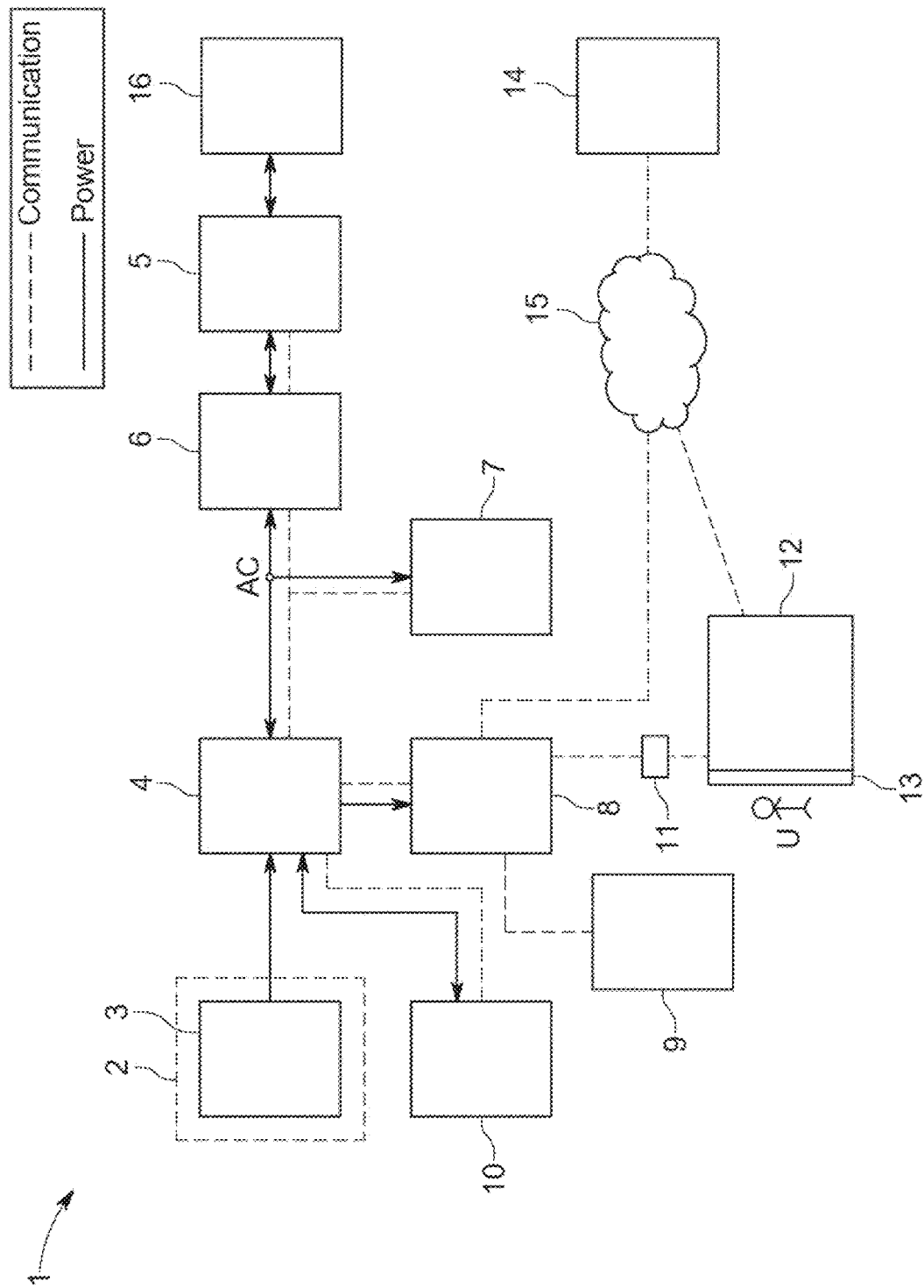
FIG. 1 shows a block diagram for illustrating a possible exemplary embodiment of an energy management system.

FIG. 1 illustrates schematically a possible exemplary embodiment of a photovoltaic system 1 comprising an energy management system 8 for managing energy flows of the photovoltaic system 1. The photovoltaic system 1 comprises at least one photovoltaic array 2 comprising photovoltaic modules 3
- adapted to generate a direct current DC power supplied to the DC side of an inverter 4. The inverter 4 is adapted to con-vert the received DC power generated by the photovoltaic mod-ules 3 of the photovoltaic array 2 into an alternating cur-rent AC power. The AC power generated by the inverter 4 can
- be supplied via AC lines and a measurement device 5 to a power supply grid 16 connected to the photovoltaic system 1.

The photovoltaic system 1 comprises in the illustrated embodiment further an emergency switch 6 which is adapted to interrupt the connection between the photovoltaic system 1 and the power supply grid 16 in case of an emergency situation,
- in particular if a power supply grid failure of the power supply grid 16 has been detected by the measurement device 5

On the AC side of the inverter 4, a load network 7 can be connected to the AC lines as shown in FIG. 1. The load network 7 comprises a plurality of power-consuming devices. For example, a power consuming device is a washing machine in a private household. Another example of the power-consuming de-vice of the load network 7 is a machine of a fabrication facility.

The load network 7 can comprise several loads of differ-ent types which consume AC power generated by the inverter 4.

The photovoltaic system 1 as illustrated in FIG. 1 further comprises an energy management unit 8 which can be also connected to the inverter 4 of the photovoltaic system 1. The energy management unit 8 can be connected to a local data memory 9 adapted to store data. The memory 9 can also be integrated in the energy management unit 8. The energy management unit 8 of the photovoltaic system 1 forms part of the energy management system used to manage energy flows of the photovoltaic system 1.

Figure 3:
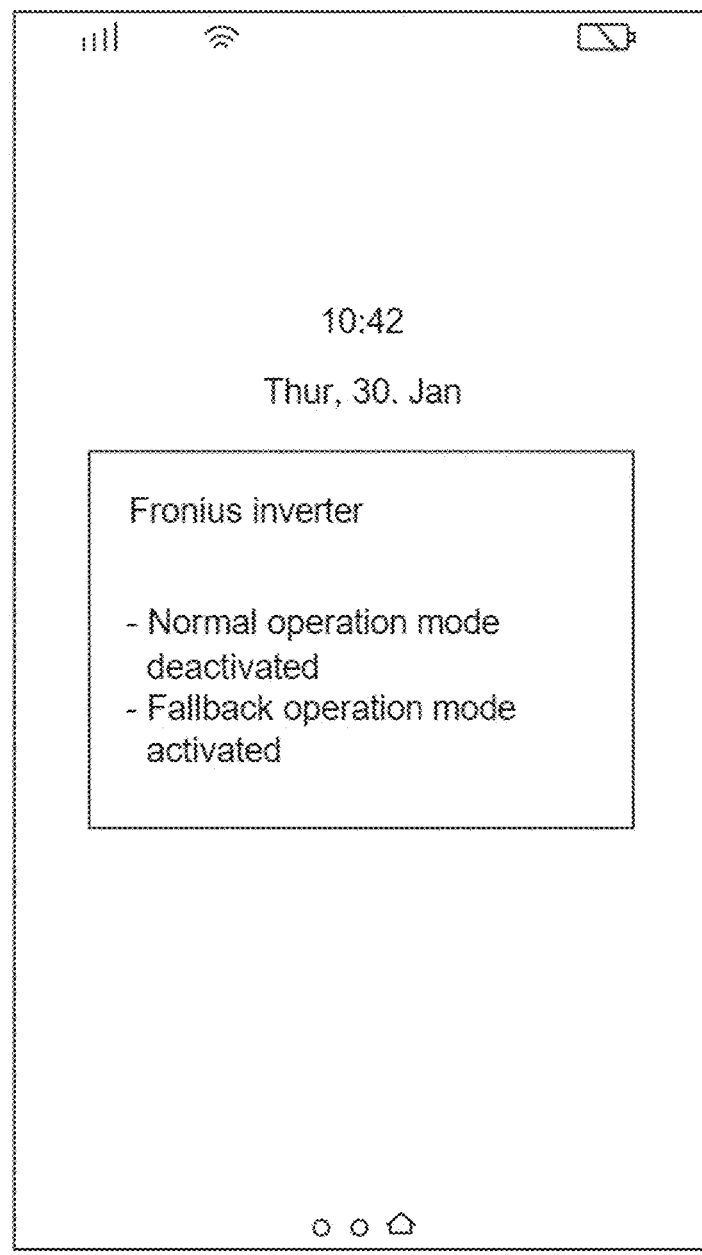
FIG. 3 shows a possible exemplary implementation of a graphical user interface of a user equipment.

Further, a storage unit 10 can be provided to store electrical energy locally in the photovoltaic system 1. This storage unit 10 can comprise a battery adapted to store DC power. In the illustrated exemplary embodiment of FIG. 1, the energy management system comprises an access point 11 having a wireless link to a mobile user equipment 12 of a user U as illustrated in FIG. 1. In an alternative embodiment, the energy management system can also be connected via a data interface to a stationary user terminal. The user equipment 12 comprises a user interface 13 to display information to the user U as shown in FIG. 3, for example a change of the operation mode.

The energy management system of the photovoltaic system 1 as illustrated in FIG. 1 makes use of the user interface 13 to notify the user U about a detected communication failure, in particular about an interruption of the communication or a server failure of the remote server 14, an unavailability of the remote server 14 and to notify the user U about a change of the operation mode. In this case an activation of a fallback operation mode can be automatically performed. Generally, the photovoltaic system 1 can run in an normal operation mode or in a fallback operation mode.

In a possible embodiment, the energy management system can be implemented on a processor (which may be located in the inverter 4 or in an external device) and can be used to calculate momentary energy flows depending on data provided by different entities of the photovoltaic system 1 including the measurement device 5 and/or loads of the load network 7. For instance, the energy management system can be implemented on a controller of the energy management unit 8 to calculate momentary energy flows depending on measured data.

In an alternative embodiment, the functionality of the energy management system can be provided at least partially by a remote server 14 which may be connected via the Internet or another data network to the photovoltaic system 1, in particular to an interface of the energy management unit 8 of the energy management system.

A failure of the power supply grid 16 may also cause an interruption of the Internet 15 which disconnects the remote server 14 from the photovoltaic system 1. The failure of the power supply grid 16 can lead to communication failure of the internet connection 15.

Figure 5:
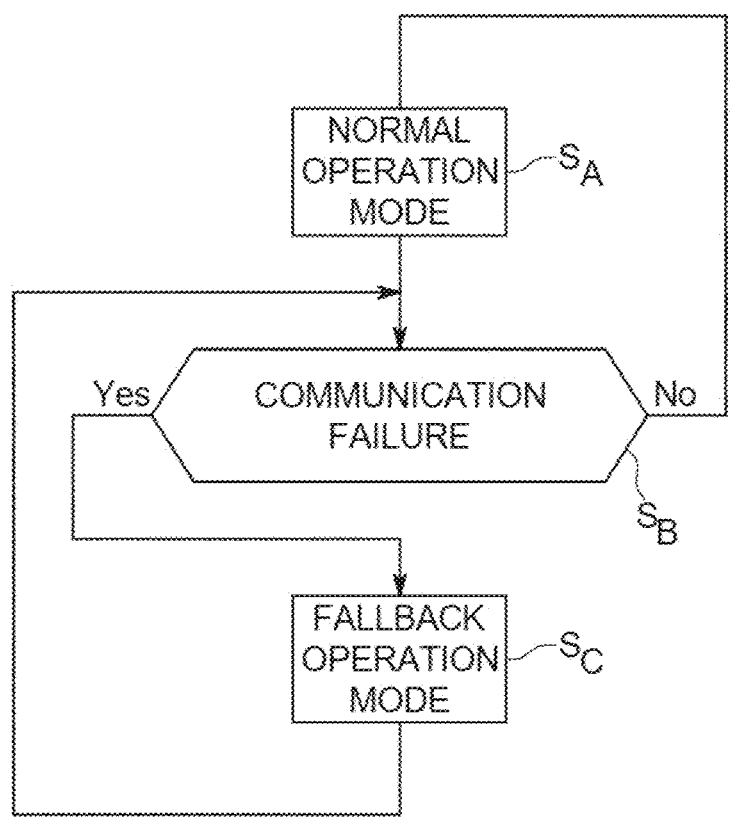
FIG. 5 shows a flowchart for illustrating a possible exemplary embodiment of a method for performing an energy flow management within a photovoltaic system according to the present invention.

In a preferred embodiment if a communication failure is detected (e.g. if the internet connection 15 is interrupted or not available and/or an unavailability of the remote server 14 is detected) the energy management system implemented on the energy management unit 8 of the photovoltaic system 1 as illustrated in FIG. 1 changes a mode from a normal operation mode to an fallback operation mode as illustrated in FIGS. 5, 6. The fallback operation mode can also be active in parallel with an emergency operation mode, if the internet connection 15 and the grid 16 are not available.

In the illustrated embodiment of FIG. 1, the user interface 13 is integrated in a user equipment 12 communicating with the energy management system 8 via a wireless connection such as wireless fidelity WiFi. In an alternative implementation, the user interface 13 can also be integrated in the energy management unit 8 of the energy management system itself. Further, the user interface 13 can also be connected to other devices communicating with the energy management system such as a LED display board which may be hung on a wall of the facility.

The user equipment 12 comprises, in a preferred embodiment, an energy management application APP which is adapted to inform the user U via the user interface 13 of the user equipment 12 about a current operation mode (the normal operation mode and the fallback operation mode) of the photovoltaic system 1. The energy management application APP can also notify a user U about the interruption of the Internet connection 15 and/or unavailability of the remote server 14 and can notify the user U that the energy management system uses local control values as setpoints instead of remote control values from the remote server 14.

Figure 2:
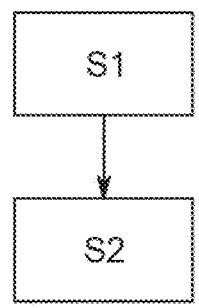
FIG. 2 shows a flowchart of a possible exemplary embodiment of a method for managing an energy flow within a photovoltaic system.

FIG. 2 illustrates a possible exemplary embodiment of a method for managing an energy flow within a photovoltaic system 1 with the fallback operation mode according to the present invention. In the illustrated embodiment of FIG. 2f the method comprises two main steps.

In a first step SI, a user U is notified by means of a user interface 13 about a change of the operation mode of the photovoltaic system 1 triggered by a detected communication failure with the remote server 14. Accordingly, the user U becomes aware that the photovoltaic system 1 now operates in the fallback operation mode using local control values and no longer in the normal operation mode where remote control values are used.

In a further step S2, the energy management system implemented on the energy management unit 8 operates in the fallback operation mode and uses the local control values.

It is also possible that the Internet connection 15 can be interrupted or impaired for other reasons than by a power supply grid failure of the power supply grid 16. For example, a server failure of the remote server 14 or a maintenance of the remotes server 14 leads to an interruption of data retrieval from the remote server 14. Accordingly, in a preferred embodiment, during the normal operation mode, an availability of the Internet connection 15 and an availability of the remote server 14 is checked regularly to ensure that the controller of the energy management unit 8 of the energy management system of the photovoltaic system 1 receives set points from the remote server 14 to perform a normal energy flow management within the photovoltaic system 1. The energy management system receives in this case remote control values which are used as setpoints for the control of the energy flows. The energy flows are therefore managed according to a remote energy management scheme. The remote control values can be calculated in real time.

If an interruption or a significant impairment of the Internet connection 15 or an unavailability of the remote server 14 is detected by the energy management system, in particular by a controller of the inverter 4 of the photovoltaic system 1, or is detected by another assigned detection unit of the energy management system of the photovoltaic system 1 which may monitor a data transfer rate or package transmission rate via the monitored Internet connection 15 the fallback operation mode for the photovoltaic system 1 is automatically initiated by the respective controller. In the fallback operation mode the energy flow within the photovoltaic system 1 is controlled by the energy management system according to local control values provided as setpoints. This is also illustrated in the flowchart of FIG. 5. The local control values

- can be stored in the data memory 9 and can be loaded as set points from the energy management unit 8 in the fallback operation mode. Consequently the energy flows are managed in the fallback operation mode according to a local energy management scheme. The local control values can be calculated in real time or can be derived from stored default values.

There is a switchover between a local energy management scheme and a remote energy management scheme in case of a detected communication failure. During the normal operation mode the remote energy management scheme is active. Both schemes can also work together. Here the local energy management scheme receives the setpoints from the remote energy management scheme and then manages the local energy flows.

In a setup mode of the application APP, a user U can perform configurations concerning the power-consuming devices of the load network 7 and the other entities of the respective photovoltaic system 1. The user U may also input additional parameters such as the time period or time window for the forecast data. For instance, the user U may indicate whether forecast data for the next 24 hours shall be stored or for a longer time period. This is a possibility to take into account the possibility of a lost internet connection.

During the setup, the energy management system can start automatically to communicate with all relevant entities of the photovoltaic system 1 via the local communication bus to receive information about the entities and loads available in the local photovoltaic system 1. Accordingly, the energy management system can collect information about the different power-consuming devices and other entities connected to the inverter 4 of the photovoltaic system 1 to generate a list displayed to the user U via the user interface 13. The user U may perform individual configurations for the displayed available loads and entities. For example, the user U can define priorities for the loads of the load network 7 in the fallback operation mode.

Based on collected information, forecast data can be calculated by the energy management system. For instance, an expected daily photovoltaic energy generation of energy by the photovoltaic array for a future number of days based on the collected information can be calculate. Further, an expected daily load usage and a total load usage for each of the loads in the load network 7 can be calculated based on the collected information and user inputs.

The energy management system dynamically schedules an amount of power to each of the available power-consuming loads based on at least one of user preferences, and/or the collected data stored in the data memory.

The energy management system according to the present invention provides in the fallback operation mode a fallback energy flow management in case that the Internet connection 15 between a remote server 14 of the system and the photovoltaic system 1 is interrupted or significantly impaired or if a server failure of the remote server 14 happens or during maintenance of the remote server 14.

The energy management system runs in a normal operation mode within the photovoltaic system 1 and is performed by controlling energy flows within the photovoltaic system 1 according to control values received as external setpoints via the Internet connection 15 from a remote energy management scheme provided by the remote server 14. If a communication failure is detected, in particular if an interruption of the Internet connection 15 between the remote server 14 and the photovoltaic system 1 is detected or a server failure of the remote server 14 is observed, a fallback operation mode of the photovoltaic system 1 is automatically initiated. The interruption of the Internet connection 15 can be detected by a controller of the inverter 4 of the photovoltaic system 1 or by an associated interruption detection unit of the photovoltaic system 1. In response to the detected Internet connection interruption or observed server failure, the energy flow within the photovoltaic system 1 is no longer controlled according to remote control values received as setpoints for the remote energy management scheme but according to local control values provided as setpoints by a local energy management scheme as illustrated schematically in FIG. 4. In case of a communication interruption and/or in case of an observed server failure of the remote server 14, the remote set points received from the remote server 14 can no longer be transmitted to the controller of the inverter 4 or to the controller of the energy management unit 8.

Figure 4:
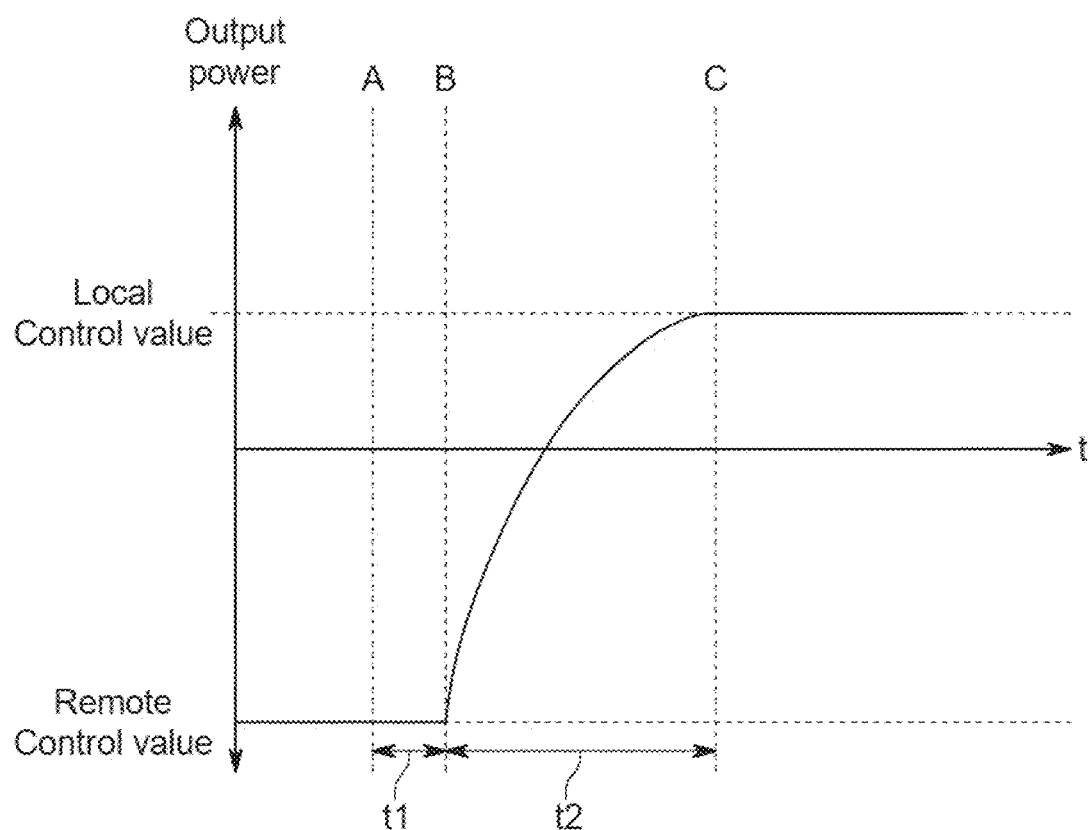
FIG. 4 illustrates the operation of a fallback energy flow management within an energy management fallback system according to the present invention.

As illustrated in the diagram of FIG. 4, at time point A a communication failure such as an interruption of the communication connection between the remote server 14 and the photovoltaic inverter 4 or a server failure of the remote server 14 occurs. The communication failure is detected during a time period t1 based for example on a data transfer rate DTR and/or package transfer rate PTR of data packages via the Internet connection 15 and/or a missing set point which is periodically transmitted (timeout of last setpoint reception). At activation time point B, the controller of the inverter 4 starts a transition to a local energy management scheme after a time period t1. The time period t1 can be for example predefined or depend from a rate level (DTR, PTR) or triggered by an event. Time period t1 is the time between occurrence of the communication failure at time point A and starting the transition at time point B from the use of remote control values to the use of local control values. The local control values are used after time point B according to the local energy management scheme. As can be seen in the diagram in FIG. 5 the function approximates the local control values smoothly during time period t2 which are reached at point C, without an abrupt change to avoid unwanted oscillations. The duration of time period t2 depends from the difference between the remote control values and the local control values. The energy management system is adapted to activate in a preferred embodiment the local energy management scheme within the time period t1 after occurrence of the interruption of the Internet connection 15 or after occurrence of the server failure (Timeout). The energy management system performs then the fallback operation mode according to the setpoints formed by the local control values as illustrated in FIG. 4.

In a preferred embodiment, the local control values are applied by the energy management system of the photovoltaic system 1 to optimize a self-consumption of electrical power generated by the photovoltaic arrays 2 of the photovoltaic system 1 by the power-consuming devices of the local load network 7 of the photovoltaic system 1. In the normal operation mode where the Internet connection 15 is not interrupted and the remote server 14 is available, the setpoints are transmitted by the remote energy management scheme run on the remote server 14. These setpoints can be transmitted by the remote server 14 via the Internet connection 15 periodically or continuously to the energy management system of the photovoltaic system 1.

FIG. 5 shows a flowchart to illustrate a possible exemplary embodiment of the different operation modes according to the present invention. During normal operation, a normal energy management is performed in step SA by controlling the energy flow within the photovoltaic system 1 according to remote control values received as setpoints via the Internet connection 15 from the remote energy management scheme run on the remote server 14. In step SB a communication failure with the remote server 14 is detected by the energy management system. This communication failure can comprise an interruption of the Internet connection 15 or an unavailability of the remote server 14. If the communication failure is detected, the energy management system switches automatically from the normal operation mode to the fallback operation mode. In the fallback operation mode a fallback energy management is automatically initiated and performed in step Sc as illustrated in FIG. 5. The fallback operation mode can be performed by the controller of the inverter 4 and/or by a controller of the energy management unit 8 forming part of the energy management system of the photovoltaic system 1 by using local control values provided as local setpoints by a local energy management scheme. The local energy management scheme applied in step Sc is directed for example to the optimization of self-consumption of energy within the photovoltaic system 1. The local control values can be read from a local data memory 9 of the photovoltaic system 1.

External set points received from the remote server 14 by the controller of the inverter 4 or by the controller of the energy management system 8 can for instance include different kinds of information like tariff data, weather data, consumption history data and forecast data. Use of local set points and local measurement data allows also an optimization of energy flows, however no optimization based also on forecast or predictions. Consequently, the use of external or remote set points allows for an optimization of the energy flows based also on predictions or forecast data during normal operation of the photovoltaic system 1.

The availability of the Internet connection 15 between the remote server 14 and the photovoltaic system 1 and the availability of the remote server 14 is checked in a possible embodiment by a controller or by a detection unit of the photovoltaic system 1 in regular time intervals and/or event driven.

An interruption of the Internet connection 15 is determined in a possible embodiment if a monitored data transfer rate, DTR, of the Internet connection 15 falls beneath a predefined data rate threshold value.

An interruption of the Internet connection 15 or an unavailability of the remote server 14 or a disruption of the remote Energy management service is determined in a possible embodiment if remote set points or data packets from the remote server 14 are no longer transferred to the energy management system One way to detect this comprises a local timeout.

An interruption of the Internet connection 15 or an unavailability of the remote server 14 or a disruption of the remote Energy management service is determined in a possible embodiment if pings from the remote server 14 are no longer transferred to energy management system. These pings can be used as periodical live signals to detect an interruption of the connection or cloud server failures.

If the Internet connection 15 is reestablished the method returns to a normal energy flow management in the normal operation mode in step SA. In the normal energy management, the energy flow within the photovoltaic system 1 is controlled according to control values received as setpoints via the established Internet connection 15 according to a remote energy management scheme run by the remote server 14.

In a possible implementation, the graphical user interface 13 can also indicate an impairment of the Internet connection 15, for instance a reduction of the available data transmission rate. If the data transmission rate of the Internet connection 15 falls beneath a predefined threshold, the transmission of the remote setpoints may take a too long time period for using them reliably as control values for the energy management system within the photovoltaic system 1. In this case, an automatic switchover to the fallback operation mode Sc is initiated by the local controller of the photovoltaic system 1. The available data transmission rate of the Internet connection 15 can be displayed to the user U by means of the graphical user interface 13. In a possible further implementation, a user U can also be informed about the cause of the Internet communication failure. The user U can for instance be informed that the Internet connection interruption is caused by a failure of the local power supply through the power supply grid 16. A user U can also be informed about other causes of the Internet connection interruption or server unavailability having triggered the switchover to the fallback operation mode of the photovoltaic system 1. During the normal operation mode, the remote control values are transmitted via a communication interface to be executed locally. However, if these external remote control values can no longer be transmitted because of an communication failure, the controller of the local inverter 4 of the photovoltaic system 1 or of the energy management unit 8 can activate after a time period t1 a fallback operation mode and can use predefined and stored local control values as described according to FIG. 4.

For example, according to FIG. 4, the electrical power of an inverter 4 can be set by an external setpoint (remote control value) such that the electrical power, i.e. the output power of the inverter 4, flows from the power supply grid 16 into the electrical storage unit 10 and to the loads of load network 7 of the photovoltaic system 1, because the price of the power from the power supply grid 16 is very low and no PV-power is available. Therefore, the output power of the inverter 4 is negative. As a local control value, a usage of the PV-power of the inverter 4 is defined to cover for instance the loads of the load network 7 of the respective photovoltaic system 1 and feed power into the power supply grid 16 if necessary. In this scenario, if an interruption of the communication connection, i.e. the Internet connection 15, or a server unavailability of the remote server 14 is detected by the controller of the inverter 4 or by another detection unit, the controller can change after a time period t1 according to an exponential function with negative exponent within the time period t2 from receiving electrical power (remote control value) to power-feeding (local control value). This local control value is only performed as long as the controller of the energy management system does not receive again an external remote control value from the remote server 14 via the reestablished Internet connection 15 or until the controller of the energy management system receives an external remote control value from the remote server 14 having become available again, e.g. after a maintenance of the remote server 14 has finished.

For a switchover from the fallback operation mode Sc to the normal operation mode SA the procedure is in principle the same. Especially during the control time t2 there is a continuous switch from the local value to the remote value and vice versa. The control time t2 is relevant for the control of the energy flow.

The invention claimed is:

1. An energy management system comprising a photovoltaic system having at least one photovoltaic array adapted to generate electrical DC power converted by an inverter of said photovoltaic system into AC power,
    wherein in a normal operation mode of the photovoltaic system an energy flow within said photovoltaic system is controlled according to control values received as setpoints via an Internet connection from a remote energy management scheme run by a remote server,
    wherein set points are transmitted by the remote energy management scheme run by the remote server during the normal operation mode periodically or continuously via the Internet connection, and
    wherein if a communication failure with the remote server is detected a fallback operation mode of the photovoltaic system is initiated where the energy flow within said photovoltaic system is controlled according to local control values provided as setpoints by a local energy management scheme.

2. The energy management system according to claim 1 wherein, after occurrence of the communication failure with the remote server at a time point, A, the energy management system uses after a time period, t1, at a time point, B, the local control values provided by the local energy management scheme in the fallback operation mode.

3. The energy management system according to claim 1 wherein a transition from the remote control values to the local control values is started after the time period, t1, and during a time period t2 the local control values are reached smoothly and used as set points to control the energy flow within said photovoltaic system.

4. The energy management system according to claim 1, wherein, in the fallback operation mode, the local energy management scheme is performed to optimize a self-consumption of electrical power generated by the photovoltaic arrays of the photovoltaic system
    by power-consuming devices of a local load network of said photovoltaic system.

5. The energy management system according to claim 1, wherein the Internet connection between the remote server and the photovoltaic system and/or an unavailability of the remote server is checked by a controller or by a detection unit of the photovoltaic system in regular time intervals.

6. The energy management system according to claim 5, wherein a communication failure with the remote server is detected by a controller or by a detection unit of the photovoltaic system if a data transfer rate, DTR, or package transfer rate, PTR, via the Internet connection falls beneath a predefined threshold value.

7. The energy management system according to claim 5, wherein a communication failure with the remote server is detected if remote set points or data packets from the remote server are no longer transferred to the photovoltaic system.

8. The energy management system according to claim 5, wherein a communication failure with the remote server is detected if pings from the remote server are no longer transferred to the photovoltaic system.

9. The energy management fallback system according to claim 1 wherein a communication failure with the remote server is notified to a user by means of a user interface.

10. A method for performing an energy management of a photovoltaic system having at least one photovoltaic array adapted to generate electrical DC power converted by an inverter of said photovoltaic system into AC power, wherein the method comprises the steps of:
    performing in a normal operation mode control of energy flows within the photovoltaic system according to control values received as setpoints via an Internet connection and calculated according to a remote energy management scheme run by a remote server,
    wherein the setpoints are transmitted by the remote energy management scheme run by the remote server the normal during operation mode periodically or continuously via the Internet connection;
    initiating a fallback operation mode of the photovoltaic system if a communication failure with the remote server is detected, wherein in the fallback operation mode the energy flows within the photovoltaic system are controlled according to local control values provided as setpoints by a local energy management scheme.

11. The method for performing an energy management of a photovoltaic system according to claim 10, wherein the local control values are read from a local data memory of the photovoltaic system or calculated in real time.

12. The method according to claim 10, wherein the Internet connection between the remote server and the photovoltaic system and/or an availability of the remote server is checked by a controller or by a detection unit of the photovoltaic system in regular time intervals.

13. The method according to claim 10, wherein a communication failure with the remote server is detected if a data transfer rate, DTR, or package transfer rate, PTR, via the Internet connection falls beneath a predefined threshold value.

14. The method according to claim 10, wherein a communication failure with the remote server
is detected if remote set points or data packets from the remote server are no longer transferred to the photovoltaic system and/or
   wherein a communication failure with the remote server is detected if pings from the remote server are no longer transferred to the photovoltaic system.

\* \* \* \* \*